(12) United States Patent
Kikuchi et al.

(10) Patent No.: US 6,515,384 B1
(45) Date of Patent: Feb. 4, 2003

(54) MOTOR/GENERATOR WITH EQUALIZED COOLANT DISTRIBUTION

(75) Inventors: Toshio Kikuchi, Yokosuka (JP); Shinichiro Kitada, Tokyo (JP); Yutaro Kaneko, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/713,038

(22) Filed: Nov. 16, 2000

(30) Foreign Application Priority Data

Nov. 17, 1999 (JP) .......................................... 11-326507

(51) Int. Cl.[7] .......................... H02K 9/19; H02K 9/197; H02K 9/23; H02K 3/24
(52) U.S. Cl. ............................... 310/58; 310/59; 310/54
(58) Field of Search .............................. 310/52, 53, 54, 310/58, 59, 86

(56) References Cited

U.S. PATENT DOCUMENTS

| | | | | |
|---|---|---|---|---|
| 2,862,120 A | * | 11/1958 | Onrud ........................... | 310/54 |
| 4,227,108 A | * | 10/1980 | Washizu et al. ............. | 310/214 |
| 4,994,700 A | * | 2/1991 | Bansal et al. ................ | 310/215 |

FOREIGN PATENT DOCUMENTS

| | | | | |
|---|---|---|---|---|
| JP | 53-95207 | | 8/1978 | |
| JP | 4-364343 | * | 12/1992 | ................... 310/54 |
| JP | 07-336946 | * | 12/1995 | ................... 310/54 |
| JP | 2716286 | | 11/1997 | |
| JP | 10-155257 | * | 6/1998 | ................... 310/58 |
| JP | 2001-145302 | * | 5/2001 | ................... 310/54 |

* cited by examiner

*Primary Examiner*—Karl Tamai
(74) *Attorney, Agent, or Firm*—Foley & Lardner

(57) ABSTRACT

A rotor (2) of a motor is fixed to a rotation shaft (9) and a stator (5) is disposed on the outer side. The stator (5) is provided with a plurality of slots (6) opening towards an outer periphery of the rotor (2). The openings of each slot (6) facing the outer periphery of the rotor (2) is closed by a cover (14). A first cooling liquid chamber (12) is formed facing the opening of the slots (6) on one end face of the stator (5). A second cooling liquid chamber (13) is formed facing the opening of the slots (6) on another end face of the stator (5). A supply port (16) of cooling liquid is provided in the first cooling chamber (12) and cooling liquid supplied from the supply port (17) to the first cooling liquid chamber (12) flows into the second cooling liquid chamber (13) through the slots (6). Coils (8) disposed on each slot (6) are efficiently and evenly cooled by the provision of members (21A, 21B, 22) that evenly distribute cooling liquid supplied from the supply port (17) to the respective slots (16).

20 Claims, 13 Drawing Sheets

MOTOR/GENERATOR WITH EQUALIZED COOLANT DISTRIBUTION

FIELD OF THE INVENTION

This invention relates to a cooling mechanism for a stator coil of a motor/generator.

BACKGROUND OF THE INVENTION

Tokkai Sho 53-95207 published by the Japanese Patent Office in 1978 and Japanese Patent 2716286 issued by the Japanese Patent Office in 1997 disclose a cooling mechanism for a synchronous motor that has a stator provided with a plurality of coils and disposed about a rotor. When the coils are provided with an alternating current with a fixed phase difference, a rotating magnetic field is formed to rotate the rotor. During this operation, the cores onto which the coils are wound generate heat. In order to perform cooling of the coils and cores, the cooling mechanism according to the prior arts provides a cooling medium into slots formed in the stator to accommodate the coils.

SUMMARY OF THE INVENTION

In order to even out the temperature of the coils, it is necessary to distribute the cooling medium evenly to the respective slots. However, the cooling mechanism according to the prior arts does not have such a function.

It is therefore an object of this invention to accomplish even cooling of the stator coils.

In order to achieve the above object, this invention provides a motor/generator comprising rotation shaft, a rotor fixed to the rotation shaft and provided with a magnet, and a cylindrical stator having both end faces orthogonally disposed with respect to the rotation shaft. The stator has a plurality of slots and coils are disposed on an inner side of the slots. Each slot has a first opening facing an outer periphery of the rotor, a second opening formed on one end face of the stator and a third opening formed on the other end face of the stator. The motor/generator further comprises covers closing the first openings of the slots, a first cooling liquid chamber facing the second openings of the slots and a second cooling liquid chamber facing the third openings of the slots. The first cooling liquid chamber has a supply port of cooling liquid and an equalizing member equalizing a distribution of cooling liquid from the supply port to each slot. The slots are functioning to form a flow of cooling liquid between the first liquid cooling chamber and the second liquid cooling chamber.

The details as well as other features and advantages of this invention are set forth in the remainder of the specification and are shown in the accompanying drawings.

DESCRIPTION OF THE PREFERRED EMBODIMENTS

Figure 1:
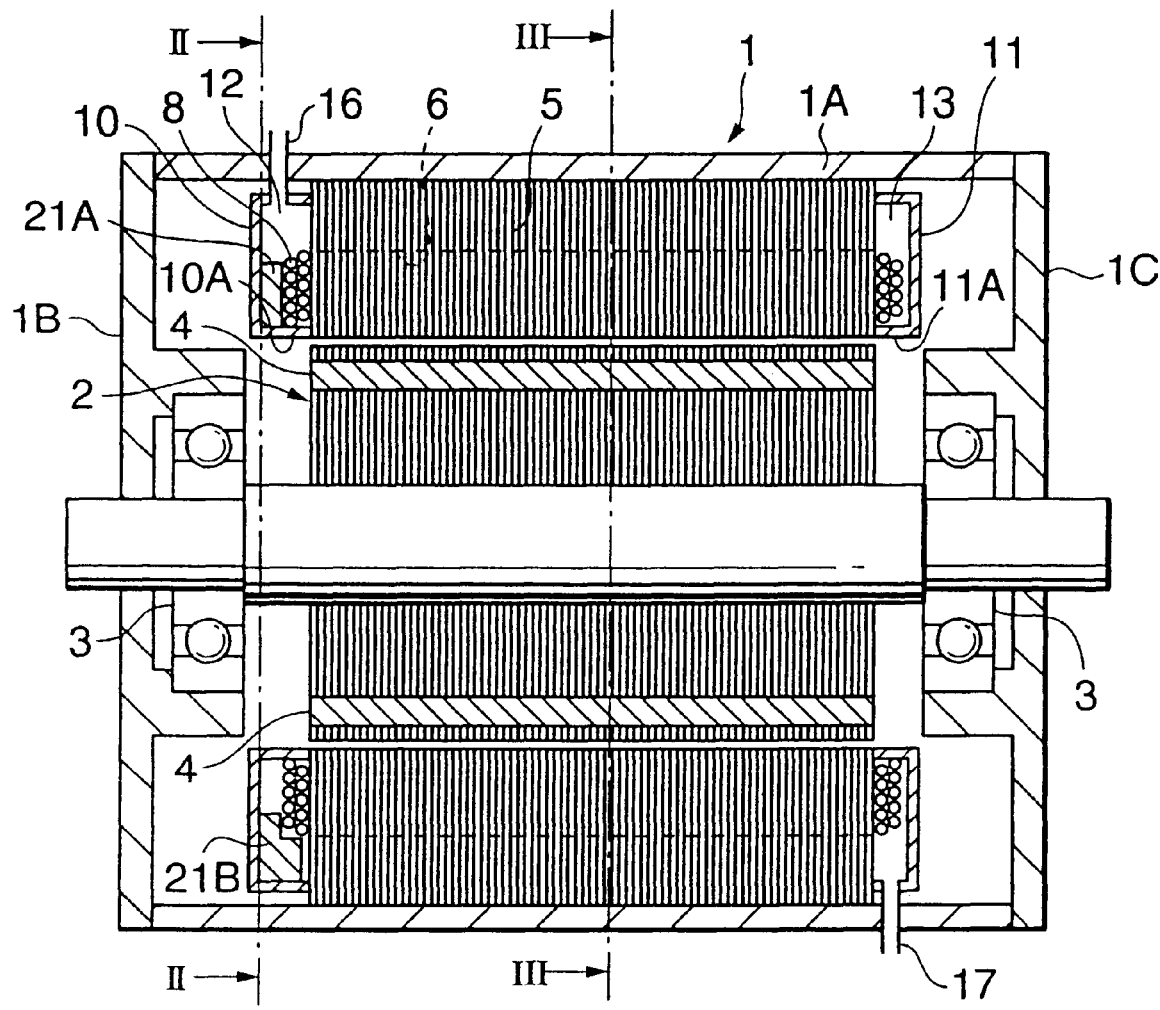
FIG. 1 is a longitudinal sectional view of a motor according to this invention.

Referring to FIG. 1 of the drawings, a motor according to this invention is provided with a case 1 formed from a cylindrical member 1A and end plates 1B, 1C closing both ends thereof.

A rotor 2 and a stator 5 are housed in the case 1.

The rotor 2 is provided with a rotation shaft 9. The rotation shaft 9 is supported to rotate freely on side plates 1B, 1C through bearings 3. The rotor 2 is provided with a plurality of magnets 4 that are disposed in proximity to its outer peripheral surface at equal angular intervals.

The stator 5 comprises iron plates laminated in the direction of the rotation shaft 9. The inner peripheral surface of the stator 5 faces the outer peripheral surface of the rotor 2 while maintaining a fixed interval.

Figure 2:
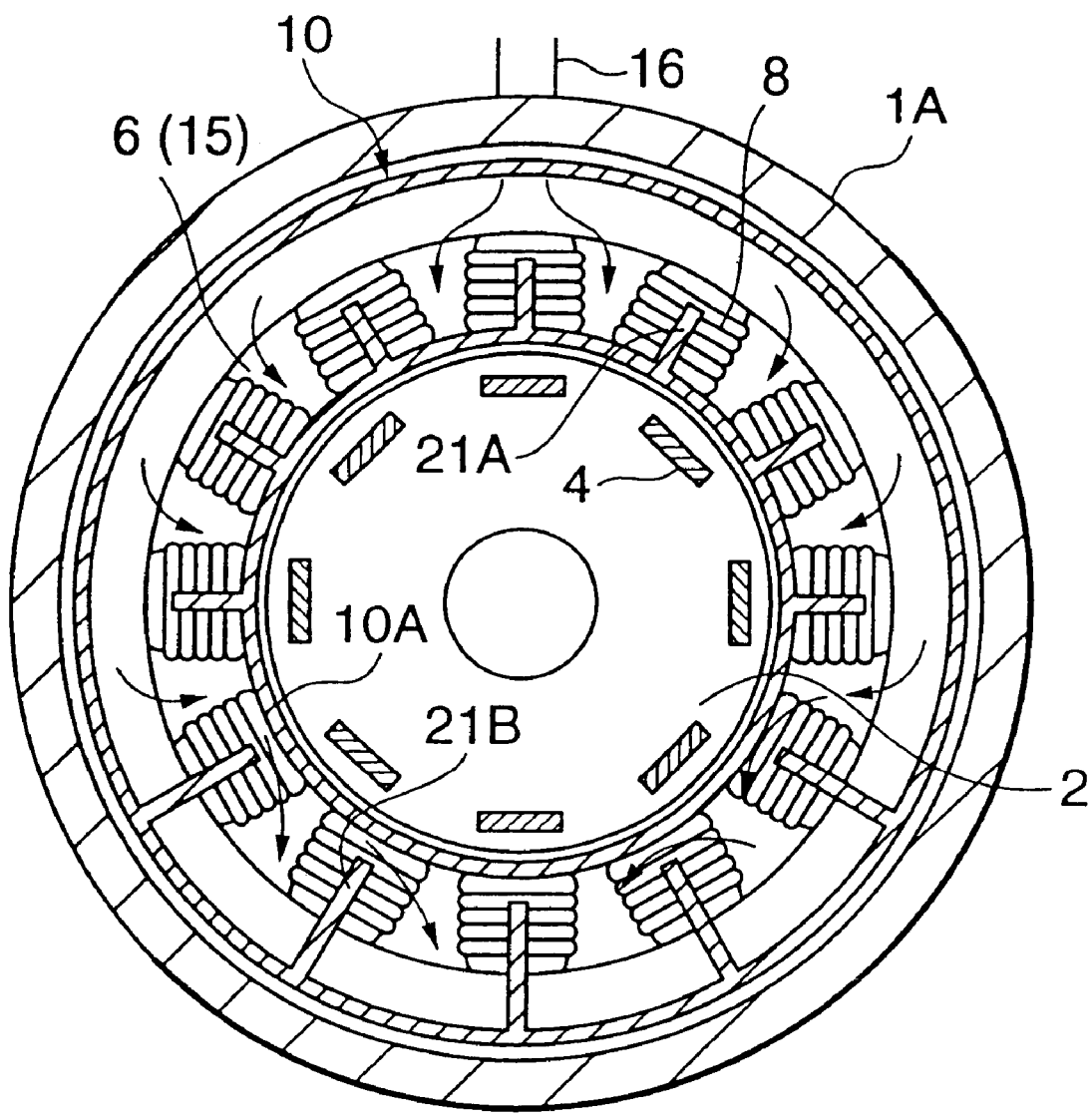
FIG. 2 is a sectional view of the motor taken along the line II—II in FIG. 1.
Figure 3:
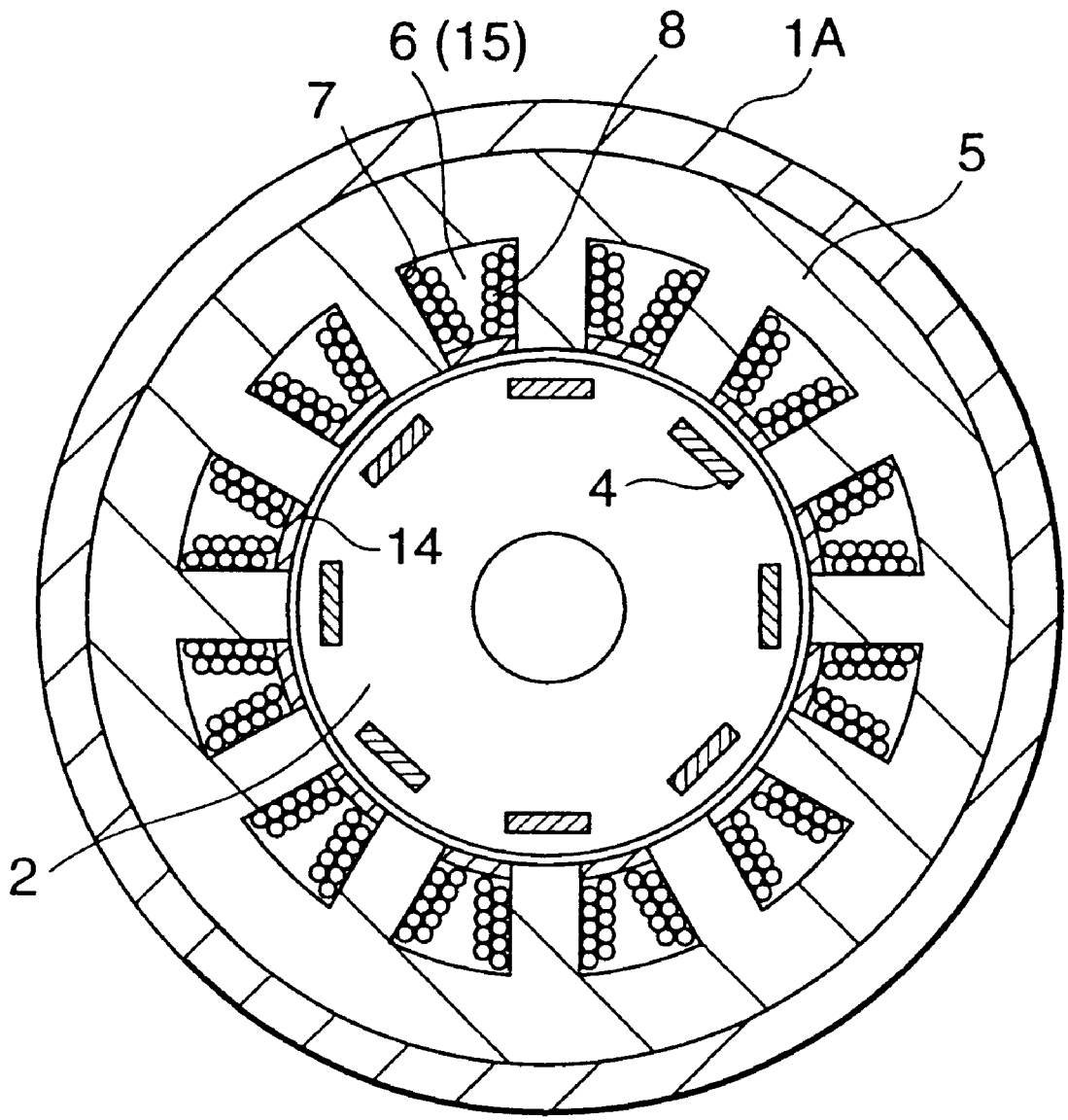
FIG. 3 is a sectional view of the line III—III in FIG. 1.
Figure 4:
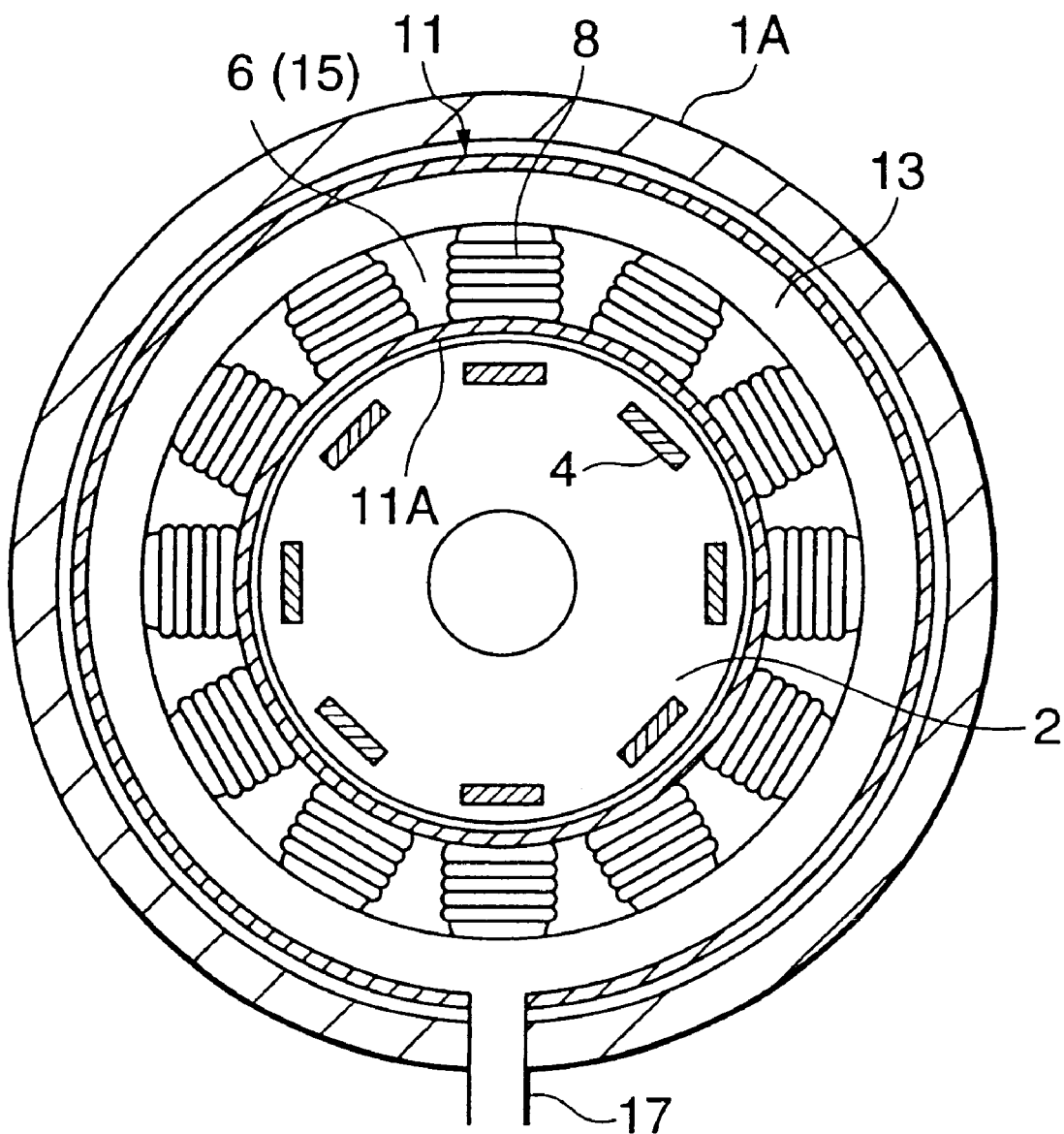
FIG. 4 is a sectional view of the motor taken along the line IV—IV in FIG. 1.

Referring now to FIGS. 2, 3 and 4, slots 6 are provided at equal angular intervals on an inner peripheral surface of the stator 5. The wall faces of the slots 6 are respectively covered by insulating paper 7. The stator 5 forms cores 5A between adjacent slots 6 and winds coils 8 onto cores 5A. When a current is passed through the coils 8, a rotating magnetic field is formed which has a number of magnetic poles which is equal to the number of magnets 4 on the rotor 2. The rotating magnetic field drives the rotor 2 synchronously. The rotational force of the rotor 2 is transmitted to outer components by the rotation shaft 9. An opening facing the rotor 2 of the slot 6 is closed by a plate-shaped cover 14 as shown in FIG. 3. This opening may be referred to as a first opening. A seal member is provided between the cover 14 and cores 5A on both sides thereof and maintains a tight seal in the slots 6.

Referring again to FIG. 1, ring-shaped oil jackets 10, 11 are mounted on both end faces of the stator 5.

Oil chambers 12, 13 communicating with each slot 6 are formed on an inner part of the oil jackets 10, 11. The cover 14 referred to above extends in the direction of the rotation shaft 9 and both ends thereof are fixed to the inner peripheral part 10A, 11A of the oil jacket 10, 11. The cover 14 and oil jackets 10, 11 are formed from a member with a high degree of insulating properties such as resin. Seals are respectively disposed on the connecting parts of the inner peripheral parts 10A, 11A with both ends of the cover 14 and the contacting parts of the oil jackets 10, 11 with both ends of the stator 5 in order to maintain a tight seal of the oil chambers 12, 13. The opening of each slot (6) facing the oil chamber 12 may be referred to as a second opening. The opening of each slot (6) facing the oil chamber 13 may be referred to as a third opening.

This structure allows the formation of a cooling passage 15 inside each slot 6 which has an equal cross sectional area and which communicates with the oil chambers 12, 13.

An oil supply port 16 is formed in the oil chamber 12 as shown in FIG. 2. The oil supply port 16 passes through the cylindrical member 1A of the case 1, opens on an outer side of the case 1 and leads cooling oil supplied from a pump disposed outside of the case 1 to the oil chamber 12.

An oil discharge port 17 is formed in the oil chamber 13 as shown in FIG. 4. The oil supply port 17 passes through the cylindrical member 1A of the case 1, opens on an outer side of the case 1 and discharges cooling oil in the oil chamber 13 into a reservoir provided outside of the case 1. An insulating oil is used for the cooling oil.

Upper partitions 21A and lower partitions 21B are provided in the oil chamber 12 as shown in FIG. 2. Upper partitions 21A are provided at equal angular intervals on an upper part of the oil chamber 12. Lower partitions 21B are provided at equal angular intervals on a lower part of the oil chamber 12. The upper partition 21A extends radially from a wall face on an inner periphery of the oil jacket 10. The lower partition 21B extends towards the center from a wall face on an outer periphery of the oil jacket 10.

A fixed interval is provided between the upper partition 21A and the outer periphery of the oil jacket 10. An interval which is smaller than the interval above is provided between the lower partition 21B and the inner periphery of the oil jacket 10.

As shown in FIG. 1, the surface area of the lower partition 21B is greater than that of the upper partition 21A.

The relationship of the respective surface areas allows the lower partitions 21B to have a greater resistance than the upper partitions 21A with respect to the cooling oil passing through the oil chamber 12. The significance of this fact is explained below.

Due to the fact that the distance traveled by oil from the oil supply port 16 to each cooling passage 15 differs, the amount of cooling oil in the cooling passage 15 is not equal even if the surface area of all cooling passages 15 is set to be equal. That is to say, since cooling oil is collected on the bottom of the oil chamber 12, the flow amount of cooling oil is larger the lower the position of the cooling passage 15.

Figure 5:
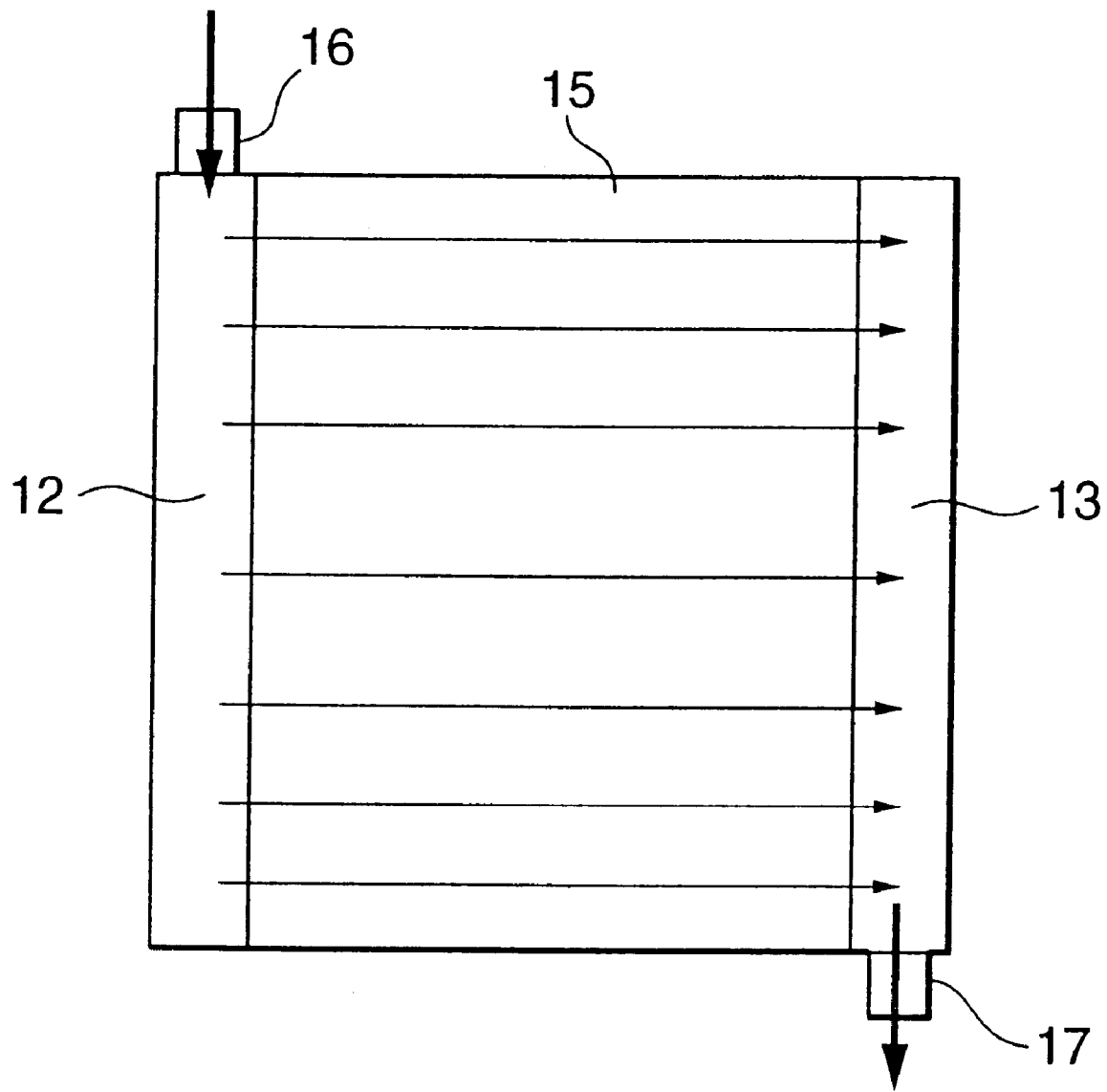
FIG. 5 is a diagram describing the flow of cooling liquid in the motor.
Figure 6:
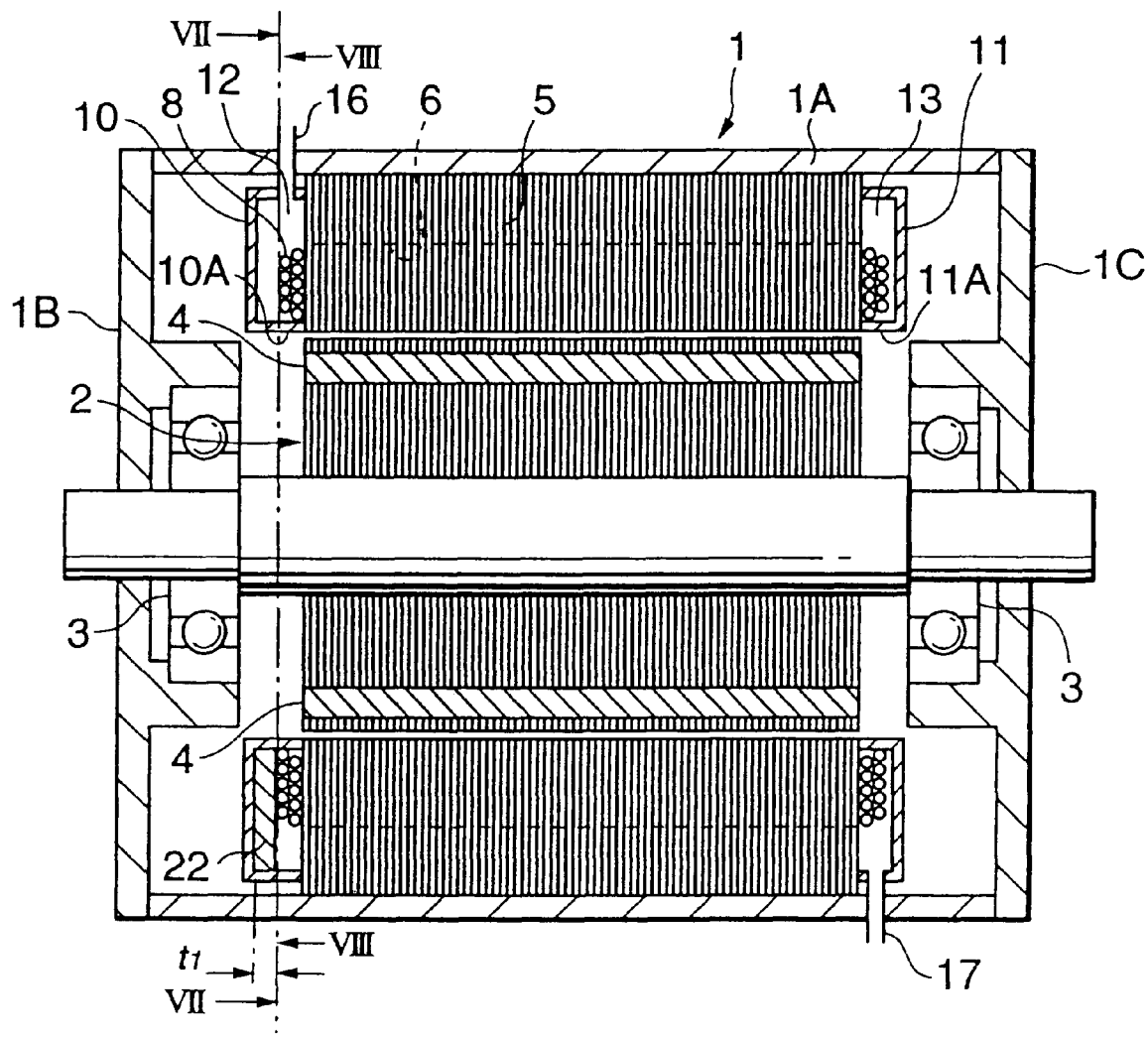
FIG. 6 is similar to FIG. 1, but showing a second embodiment of this invention.

The partitions 21A, 21B increase the inflow amount of cooling oil into the cooling passages 15 which open onto the upper part of the oil chamber 12 and thus equalize the distribution of cooling oil into each cooling passage 15 as shown in FIG. 5. In this manner, equivalent cooling of the coils 8 is performed by equalizing the distribution of cooling oil into each cooling passage 15. The cooling oil in the cooling passages 15 has a higher cooling efficiency due to direct contact with the coils 8.

The use of the inner part of the slot 6 as a cooling passage 15 removes the necessity to form a new passages on an inner part of the stator 5. Thus it is possible to perform highly-efficient and even cooling of the coils 8 with a simple structure.

A second embodiment of this invention will be described with reference to FIGS. 6–9.

In this embodiment, a three-phase current formed from phases U, V, W is supplied with a fixed phase difference to the coils 8. For this reason, cables are led to each coil 8 from the outside and are connected to each coil 8 through the inner part of the oil chamber 12.

Figure 7:
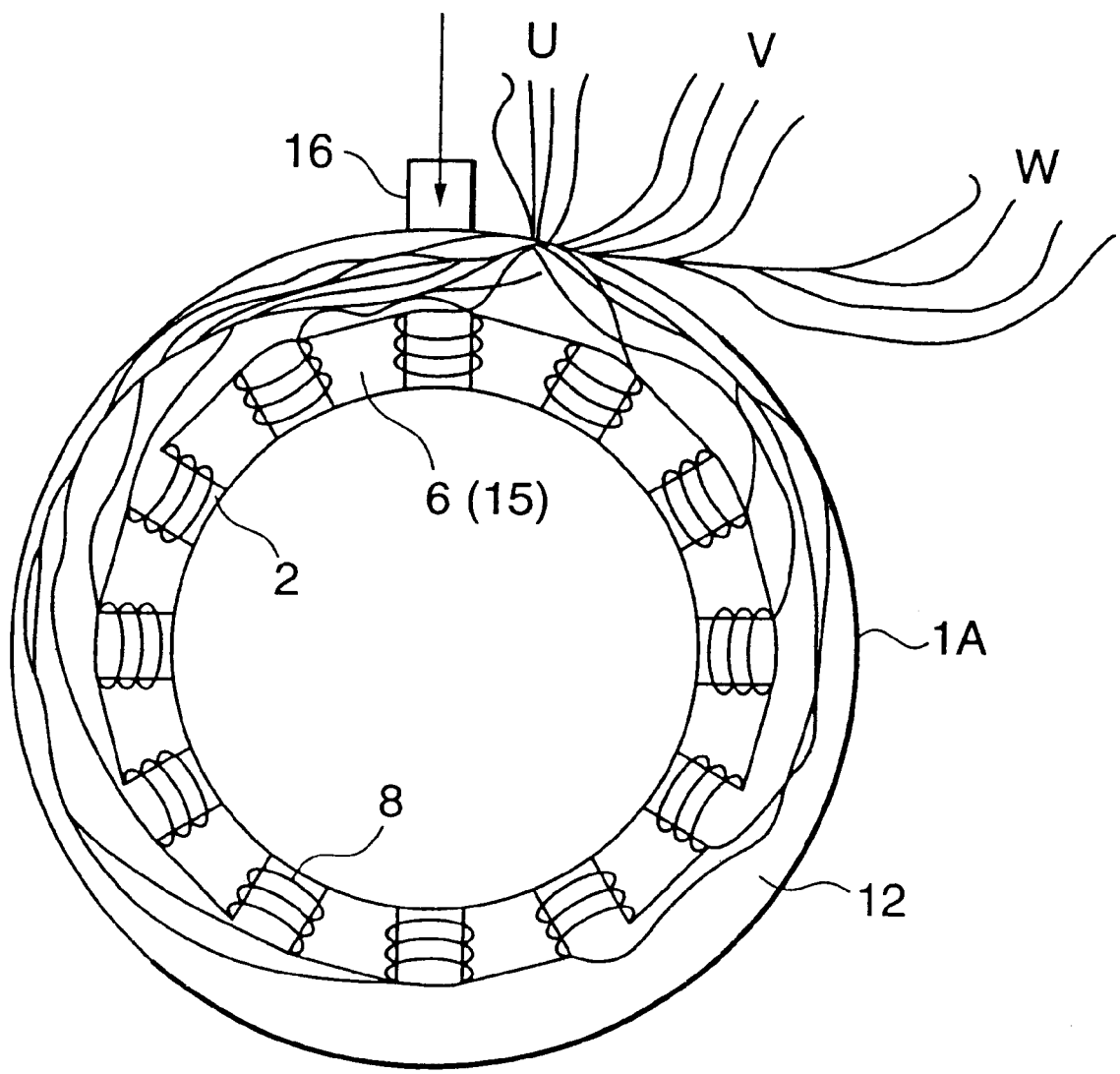
FIG. 7 is a sectional view of the motor according to the second embodiment of this invention taken along the line VII—VII in FIG. 6.

These cables pass through the wall face of the cylindrical member 1A from the upper part of the case 1 as shown in FIG. 7 and exit the outer side of the case 1. As a result, the cables are concentrated in an upper space in the oil chamber 12 which increases the flow resistance of cooling oil in the upper part of the oil chamber 12.

Figure 8:
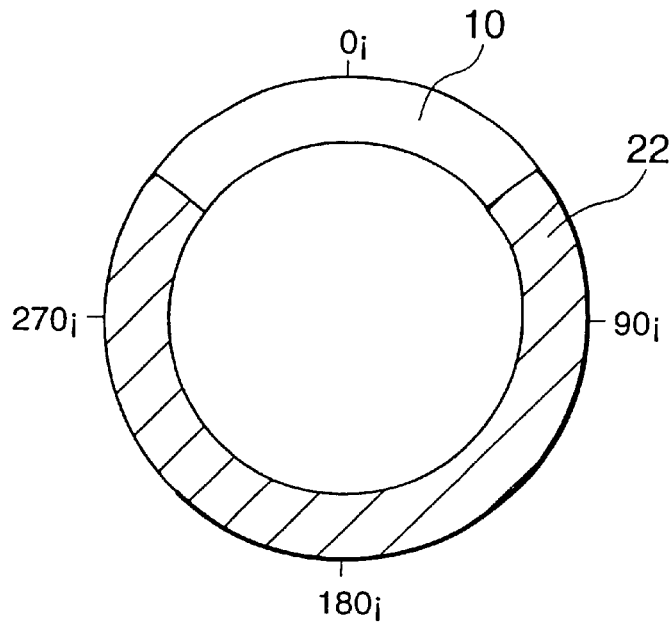
FIG. 8 is a sectional view of the motor according to the second embodiment of this invention taken along the line VIII—VIII in FIG. 6.
Figure 9:
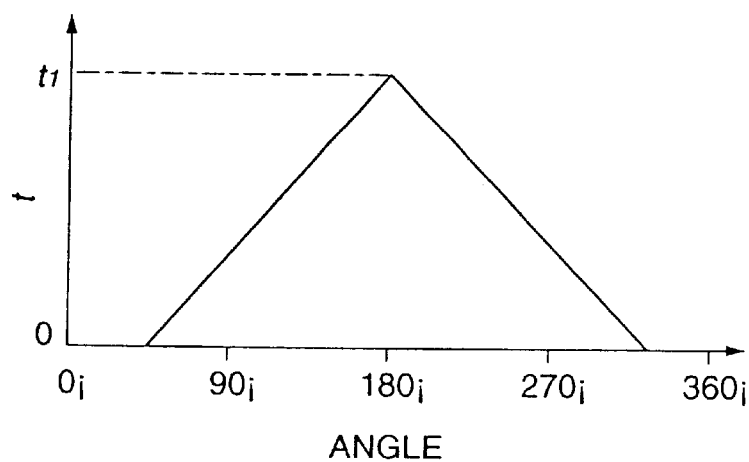
FIG. 9 is a diagram describing the relationship of an angular position of a stator and a thickness t of a volume regulation member according to the second embodiment of this invention.

In this embodiment, a volume regulation member 22 is provided in the oil chamber 12 on the inner side of the oil jacket 10. The volume regulation member 22 is formed to an arc shape as shown in FIG. 8. When the top of the oil chamber 12 is taken to be 0 degrees, the volume regulation member 22 exists in a range from 45 degrees to 315 degrees. Furthermore the surface area of the cross section of the volume regulation member 22, that is to say, the thickness t of the member varies gradually in a peripheral direction. As shown in FIG. 9, the thickness t of the member has a maximum thickness $t_1$ at 180 degrees at the lowermost position of the oil chamber 12. The thickness t of the member is zero at the 45 degrees and 315 degrees which correspond to both ends of the volume regulation member 22. The thickness t varies gradually between maximum thickness $t_1$ and zero according to the angular position of the sections of the volume regulation member 22.

The oil chamber 12 is locally narrowed due to the current-supply cables for the coils 8. However, by disposing the volume regulation member 22 in the oil chamber 12, it is possible to prevent an unequal distribution of cooling oil in the cooling passages 15 due to the disposition of the current-supply cables.

It is also possible to perform a further precise regulation of the distribution of the cooling oil to the cooling passages 15 when this embodiment is combined with the partitions 21A and 21B of the first embodiment.

A third embodiment of this invention will be described with reference to FIGS. 10–15.

Figure 10:
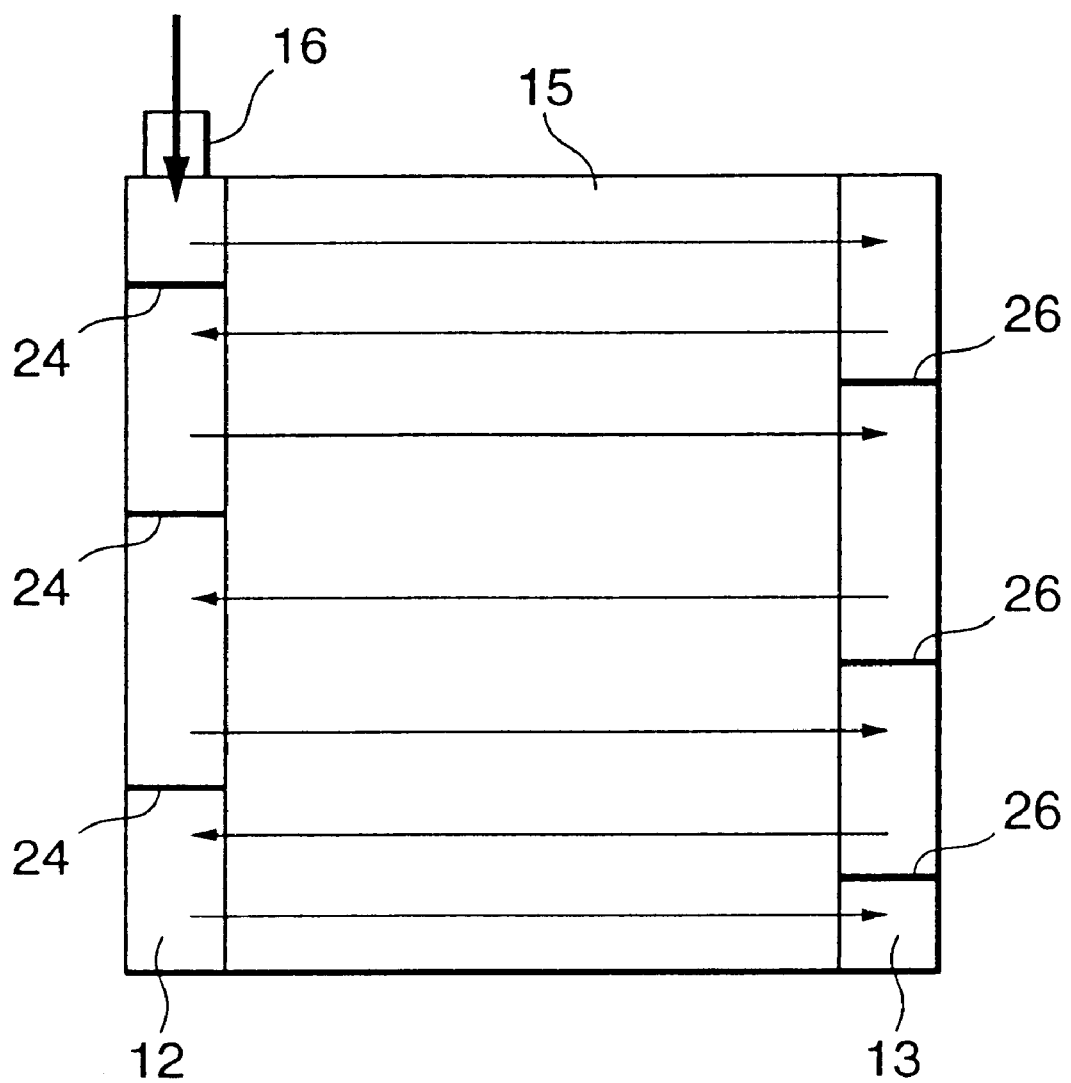
FIG. 10 is a diagram describing the flow of cooling liquid in the motor according to a third embodiment of this invention.
Figure 11:
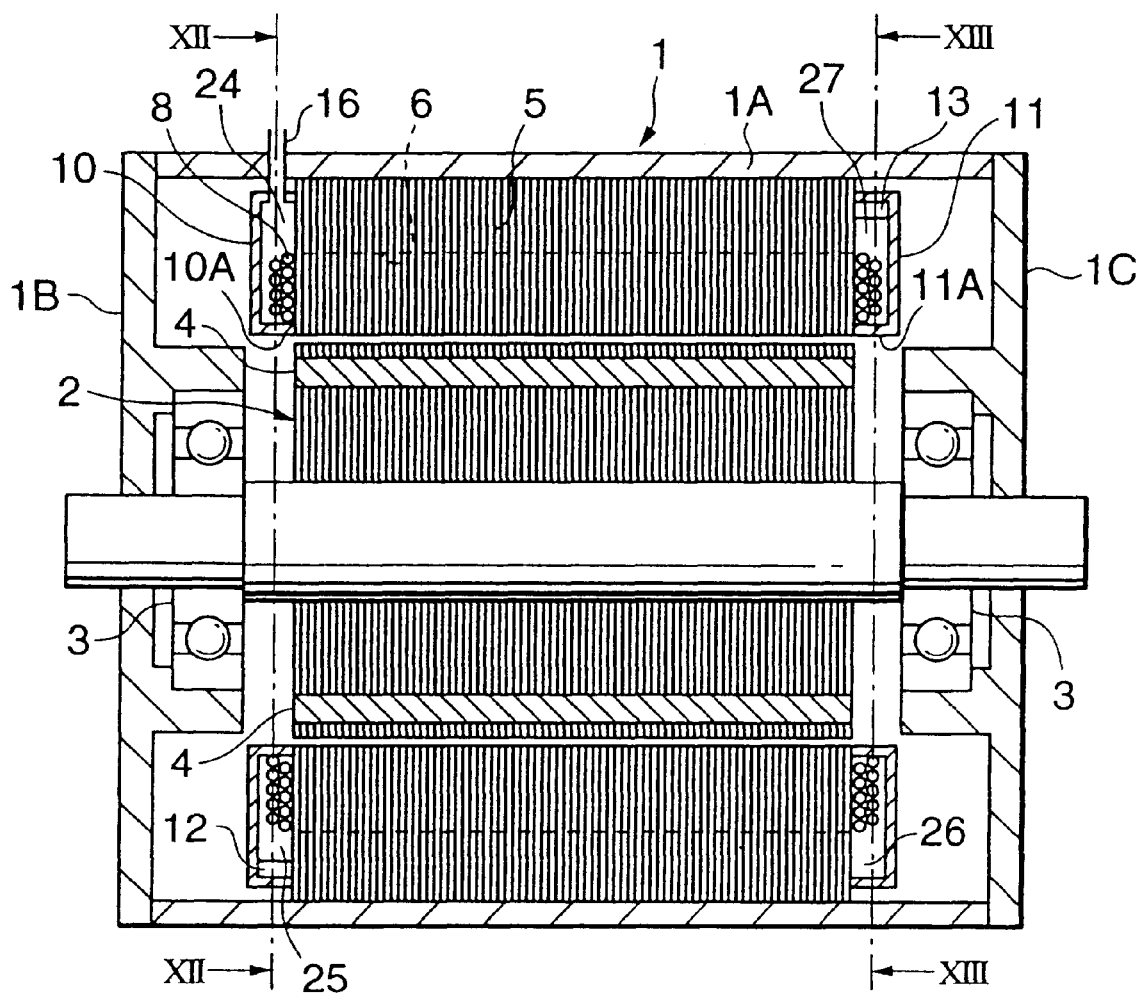
FIG. 11 is similar to FIG. 1, but showing the third embodiment of this invention.

In the first and second embodiments, cooling oil flows in one direction in each cooling passage 15 towards the oil chamber 13 from the oil chamber 12. A motor according to this embodiment, as shown in FIG. 10, cooling oil forms reciprocal flow between the oil chambers 12 and 13 and flows downwardly in the cooling passages 15.

An oil discharge port 17 is provided in the oil chamber 12 adjacent to the oil supply port 16.

Figure 12:
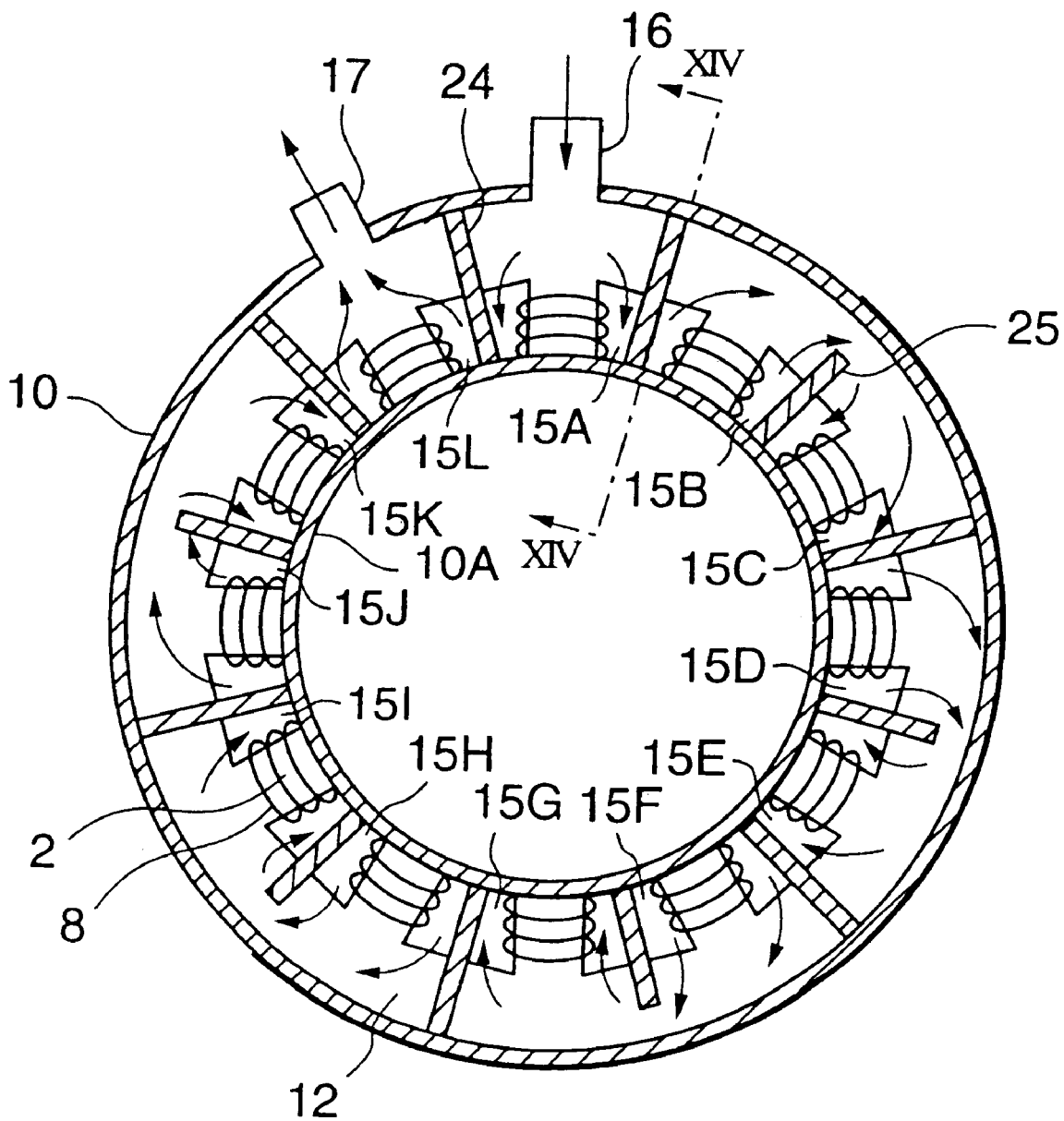
FIG. 12 is a sectional view of the motor according to the third embodiment of this invention taken along the line XII—XII in FIG. 11.
Figure 14:
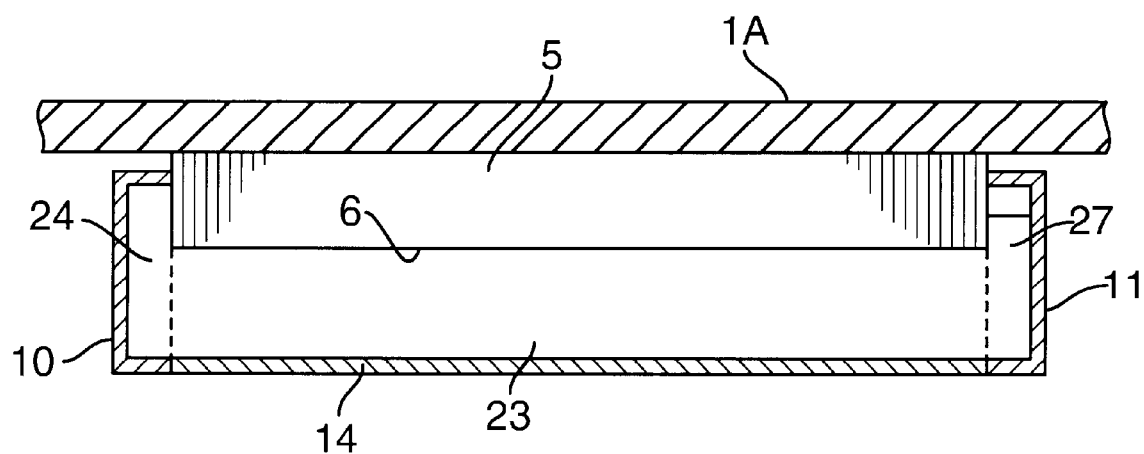
FIG. 14 is a partial cross sectional view of the motor according to the third embodiment of this invention taken along the line XIV—XIV in FIG. 12 and FIG. 13.

A boundary plate 23 is provided on the center of each slot 6 of the stator 5 as shown in FIG. 14. A full partition 24 and a semi-partition 25 are provided in the oil chamber 12 as shown in FIG. 12. The full partition 24 and a semi-partition 25 are formed as a part of the boundary plates 23 at the end facing the oil chamber 12. The full partition 24 is a partition extending from the inner periphery to the outer periphery of the oil jacket 10. A space on both sides of the full partition 24 is completely isolated and prevents the flow of oil between respective spaces. The semi-partition 25 extends radially towards an outer side from the inner periphery of the oil jacket 10 and completes a fixed interval remaining with respect to the outer periphery of the oil jacket 10.

Oil in the oil chamber 12 flows over the semi-partition 25, however oil flow is prevented over the full partition 24.

Figure 13:
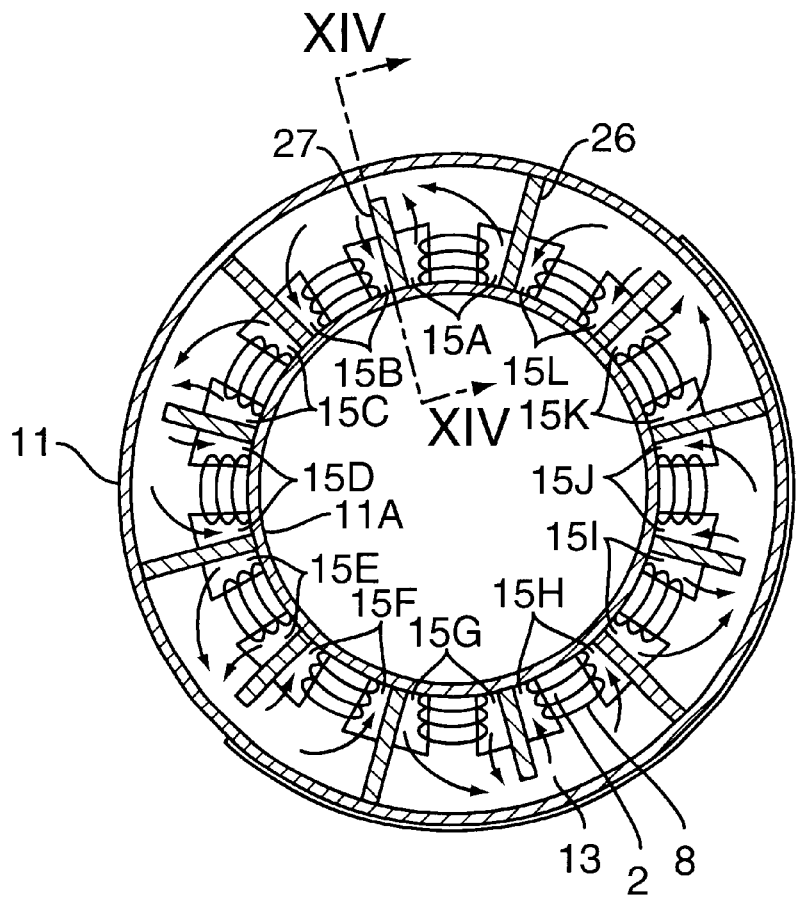
FIG. 13 is a sectional view of the motor according to the third embodiment of this invention taken along the line XIII—XIII in FIG. 11.

Referring now to FIG. 13, the interior of the oil chamber 13 is partitioned by a full partition 26 formed in the same manner as the full partition 24 and a semi-partition 27 formed in the same manner as the semi-partition 25. The full partition 26 and the semi-partition 27 are formed as a part of the boundary plate 23 at the end facing the oil chamber 13.

Due to the above structure, the cooling passages 15 are partitioned into the passages 15A–15L by the boundary plate 23. As shown in FIG. 13, since the passages on both sides of each coil 8 are mutually connected with each other in the oil chambers 12, 13, they are considered to be a part of one passage and are designated by the same reference number.

Figure 15:
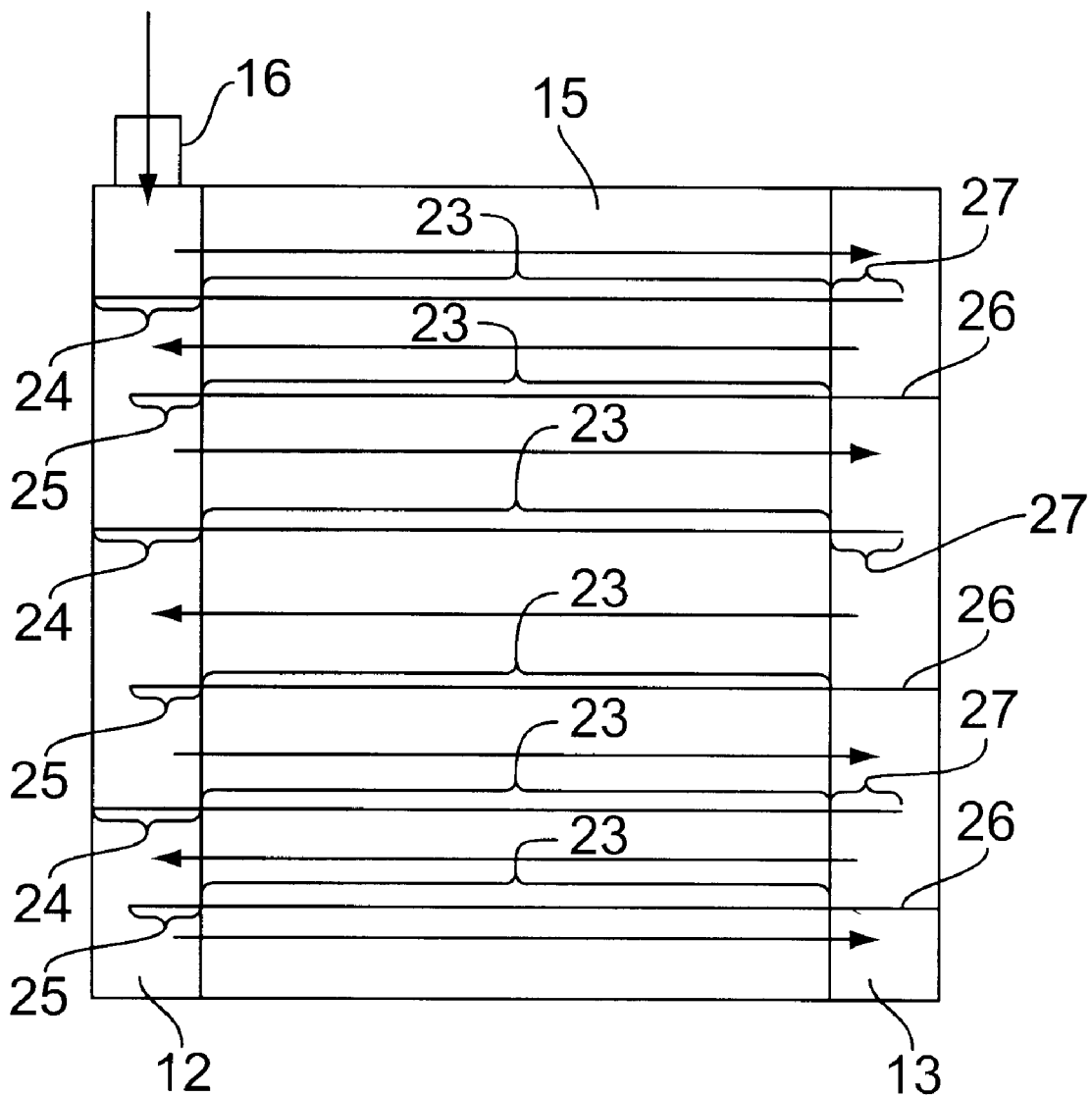
FIG. 15 is a conceptual flow diagram describing the flow of cooling liquid in the motor in FIG. 10 with the boundary plates and semi-partitions of FIG. 14 also shown.

The disposition of the full partition 24 and the semi-partition 25 in the oil chamber 12 and the disposition of the full partition 26 and the semi-partition 27 in the oil chamber 13 will now be described in reference to FIG. 15 as follows.

The full partitions 24 and 26 are formed on both ends of the boundary plate 23 which is positioned on the border of the passage 15A directly connected to the oil supply port 16 and the passage 15L directly connected to the oil discharge port 17. By this arrangement, the passages 15A and 15L are completely isolated.

With respect to the other boundary plates 23, a semi-partition 27 is formed on another end of the boundary plate 23 which forms the full partition 24 on one end. A full partition 26 is formed on another end of the boundary plate 23 which forms the semi-partition 25 on one end.

As shown in FIG. 12, a space facing the oil supply port 16 is partitioned by the full partition 24. In the same manner, a space facing the oil discharge port 17 is partitioned by the full partition 24. Full partitions 24 and semi-partitions 25 are alternatively disposed in the remaining space in the oil chamber 12.

The above structure enables cooling oil supplied to the oil supply port 16 to undergo reciprocating flow between the oil chamber 12 and the oil chamber 13 as shown in FIG. 10. Cooling oil flows through all the passages 15A–15L in the stator 5 and finally is discharged into the reservoir from the oil discharge port 17.

Thus the flow amount of cooling oil in each passage 15A–15L is completely equal.

The above embodiment of this invention has been described as adapted to a motor. However it is possible to adapt this invention to a generator. Various methods of mounting the oil jackets 10 and 11 on the ends of the stator 5 may be considered. For example, it is possible to grip the oil jackets 10 and 11 by the case 1 and the stator 5.

It is possible to engage a cylindrical cover which covers the entire inner peripheral face of the stator on the inner periphery of the stator 5 instead of providing the separate plate-shaped covers 14 to close the slots 16.

In the first and second embodiments, it is possible to provide through holes through the cores 5A. The through holes communicate between adjacent cooling passages 15 in order to equalize the temperature of the cooling passages 15.

It is possible to vary the flow amount of cooling oil in the cooling passages 15 in response to temperature distributions when a temperature differential exists between the cooling passages 15 due to an angular position.

The cooling passages 15 need not be formed in all slots 6, and it is possible to form cooling passages 15 only in specified slots 6 which are liable to undergo high temperatures.

In the third embodiment, the oil chambers 12 and 13 allow oil flow only between adjacent passages. That is to say, in the oil chamber 13, the passage 15A is only connected with the passage 15B and in the oil chamber 12, the passage 15B is only connected to the passage 15C.

However it is possible to connect three or more passages at the same time by changing the position of the partitions 24, 25, 26, 27. For example, in the oil chamber 12, the passages 15B, 15C, 15D are interconnected. In the oil chamber 13, the passages 15D, 15E, 15F are interconnected. It is also possible to provide a plurality of oil supply ports 16 or oil discharge ports 17.

In the claims below, the oil chamber 12 comprises the first cooling liquid chamber and the oil chamber 13 comprises the second cooling liquid chamber.

The contents of Tokugan Hei 11-326507, with a filing date of Nov. 17, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claim is:

1. A motor/generator comprising:
    a rotation shaft;
    a rotor fixed to the rotation shaft and provided with a magnet;
    a cylindrical stator having both end faces orthogonally disposed with respect to the rotation shaft, the stator having a plurality of slots, and coils disposed on an inner side of the slots, each slot having a first opening facing an outer periphery of the rotor, a second opening formed on one end face of the stator and a third opening formed on the other end face of the stator;
    covers closing the first openings of the slots;
    a first cooling liquid chamber facing the second openings of the slots, the first cooling liquid chamber having a supply port of cooling liquid and an equalizing member equalizing a distribution of cooling liquid from the supply port to each slot; and
    a second cooling liquid chamber facing the third openings of the slots, the slots functioning to form a flow of cooling liquid between the first cooling liquid chamber and the second cooling liquid chamber,
    wherein said equalizing member increases a flow resistance at a portion of the cylindrical stator below said rotor compared to a portion of the cylindrical stator above said rotor.

2. The motor/generator as defined in claim 1, wherein the equalizing member comprises a partition partially limiting a flow of cooling liquid in the first cooling chamber.

3. The motor/generator as defined in claim 2, wherein the first cooling chamber comprises an upper part and a lower part, the partition comprises an upper part partition partitioning the upper part and a lower partition partitioning the lower part, a cross sectional area of cooling liquid flow which passes through the lower partition being set to be smaller than a cross sectional area of cooling liquid flow which passes through the upper partition.

4. The motor/generator as defined in claim 1, wherein the first cooling liquid chamber is formed to a ring shape, and the equalizing member comprises a volume regulation member which extends in a peripheral direction in the first cooling liquid chamber and includes a varying cross sectional area in the peripheral direction.

5. The motor/generator as defined in claim 4, wherein the first cooling chamber comprises an upper part and a lower part, the volume regulation member is formed in a shape with which a volume of the lower part is smaller than a volume of the upper part.

6. The motor/generator as defined in claim 5, wherein a lead line supplying a current to the coils is arranged to pass through the upper part of the first cooling chamber.

7. A motor/generator comprising:
a rotation shaft;
a rotor fixed to the rotation shaft and provided with a magnet;
a cylindrical stator having both end faces orthogonally disposed with respect to the rotation shaft, the stator having a plurality of slots including a boundary plate disposed within each slot and extending in a direction of the rotation shaft, each boundary plate defining two cooling liquid flow paths within each slot, and coils disposed on an inner side of the slots, each slot having a first opening facing an outer periphery of the rotor, a second opening formed on one end face of the stator and a third opening formed on the other end face of the stator;
covers closing the first openings of the stator;
a first cooling liquid chamber facing the second openings of the slots, the first cooling chamber comprising a first partition which is formed as a part of a specific boundary plate and allows an intercommunication among cooling liquid flow paths of a first group while preventing the cooling liquid flow paths of the first group from communicating with cooling liquid flow paths of a second group;
a second cooling liquid chamber facing the third openings of the slots, the second cooling chamber comprising a second partition which is formed as part of a specific boundary plate and allows intercommunication among cooling liquid flow paths of a third group while preventing the cooling liquid flow paths of the third group from communicating with cooling liquid flow paths that do not belong to the third group, the third group comprising one of the cooling liquid flow paths of the first group and the cooling liquid flow paths of the second group.

8. The motor/generator as defined in claim 7, wherein the first cooling liquid chamber comprises a cooling liquid supply port which introduces cooling liquid into the first cooling liquid chamber and a cooling liquid discharge port which discharges cooling liquid from the first cooling liquid chamber.

9. The motor/generator as defined in claim 7, wherein the second partition is formed as a part of a boundary plate other than the specific boundary plate of which the first partition is formed as a part.

10. The motor/generator as defined in claim 7, wherein all the slots are connected in series through the first cooling liquid chamber and the second cooling liquid chamber.

11. The motor/generator as defined in claim 1, wherein said equalizing member has a cross-sectional area that varies circumferentially about said rotor.

12. The motor/generator as defined in claim 1, wherein said first cooling liquid chamber is formed with an asymmetric cross-section.

13. The motor/generator as defined in claim 1, wherein said equalizing member forms an asymmetric cross-section within said first cooling liquid chamber.

14. A motor/generator including a rotation shaft and a rotor fixed to the rotation shaft, the motor/generator comprising:
a cylindrical stator having end faces orthogonally disposed with respect to the rotation shaft, the stator including a plurality of cooling slots, each slot having a first opening formed on an end face of the stator and a second opening formed on the other end face of the stator;
a first cooling chamber facing the first openings of the slots, the first cooling liquid chamber having a supply port of cooling liquid;
a second cooling liquid chamber facing the second openings of the slots, the slots providing a coolant flow path between the first liquid cooling chamber and the second liquid cooling chamber,
wherein said first cooling chamber comprises means for increasing a flow resistance at a portion of the cylindrical stator below said rotor compared to a portion of the cylindrical stator above said rotor.

15. The motor/generator as defined in claim 14, wherein said means for increasing comprises said first cooling chamber with an asymmetric cross-section.

16. The motor/generator as defined in claim 14, wherein said means for increasing comprises a volume regulation member positioned within said first cooling chamber and having a cross-sectional area that varies circumferentially about the rotor.

17. The motor/generator as defined in claim 14, wherein said means for increasing comprises a partition partially limiting coolant flow in the first cooling chamber.

18. A motor/generator including a rotation shaft and a rotor fixed to the rotation shaft, the motor/generator comprising:
a cylindrical stator having end faces orthogonally disposed with respect to the rotation shaft, the stator including a plurality of cooling slots, each slot having a first opening formed on an end face of the stator and a second opening formed on the other end face of the stator;
a first cooling chamber facing the first openings of the slots, the first cooling liquid chamber having a supply port of cooling liquid;
a second cooling liquid chamber facing the second openings of the slots, the slots providing a coolant flow path between the first liquid cooling chamber and the second liquid cooling chamber,
wherein said first cooling chamber has a cross-sectional area substantially perpendicular to said rotor that varies circumferentially about said rotor to equalize the liquid coolant flow below said rotor compared to above said rotor.

19. The motor/generator as defined in claim 18, wherein said cross sectional area is asymmetric with respect to a plane substantially parallel to said rotor and perpendicular to said cross-sectional area.

20. The motor/generator as defined in claim 18, further comprising an equalizing member positioned within said first cooling chamber, said equalizing member having a thickness that varies circumferentially about said rotor.

* * * * *